United States Patent
Giuliani et al.

[11] Patent Number: 5,953,868
[45] Date of Patent: *Sep. 21, 1999

[54] LOADING DOCK SEAL ASSEMBLY

[75] Inventors: Jon A. Giuliani, Whitefish Bay, Wis.; William Triervieler, Dubuque, Iowa; David J. Hoffman, Dubuque, Iowa; Thomas J. Boffeli, Dubuque, Iowa; Thomas J. Medley, Dubuque, Iowa; Robert J. Frommelt, Peosta, Iowa; Kenneth F. Lenz, Cuba City, Wis.; Thomas E. Duccini, Dubuque, Iowa

[73] Assignee: Rite-Hite Holding Corporation, Milwaukee, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/822,435

[22] Filed: Mar. 21, 1997

Related U.S. Application Data

[63] Continuation of application No. 08/116,870, Sep. 3, 1993, abandoned, which is a continuation-in-part of application No. 08/079,145, Jun. 17, 1993, Pat. No. 5,394,662.

[51] Int. Cl.$^6$ ..................................................... E04F 10/04
[52] U.S. Cl. ............................................................ 52/173.2
[58] Field of Search .................................. 52/173.2, 2.11, 52/2.12; 160/181, 124; 49/475.1

[56] References Cited

U.S. PATENT DOCUMENTS

| | | |
|---|---|---|
| 3,403,489 | 10/1968 | Frommelt et al. . |
| 3,500,599 | 3/1970 | Sciolino . |
| 3,638,667 | 2/1972 | Frommelt et al. . |
| 3,854,257 | 12/1974 | Lobel . |
| 3,875,954 | 4/1975 | Frommelt et al. . |
| 3,915,183 | 10/1975 | Frommelt . |
| 3,934,380 | 1/1976 | Frommelt et al. . |
| 4,213,279 | 7/1980 | Layne . |
| 4,328,273 | 5/1982 | Yackiw . |
| 4,601,142 | 7/1986 | Frommelt . |
| 4,638,612 | 1/1987 | Bennett . |
| 4,679,364 | 7/1987 | Fettig et al. . |
| 4,711,059 | 12/1987 | Layne . |
| 4,718,207 | 1/1988 | Frommelt . |
| 4,799,342 | 1/1989 | Klevnjans . |
| 4,805,362 | 2/1989 | Frommelt et al. . |
| 4,873,800 | 10/1989 | Frommelt et al. . |
| 5,394,662 | 3/1995 | Giuliani ................................. 52/173.2 |

*Primary Examiner*—Beth A. Aubrey
*Attorney, Agent, or Firm*—Marshall, O'Toole, Gerstein, Murray & Borun

[57] ABSTRACT

A loading dock shelter having a resilient and flexible seal assembly is provided for forming a substantially air-tight seal between the dock opening and the truck. The seal assembly comprises a support or panel member which is adapted to attach to the loading dock frame and to support a seal member. The seal member has a substantially hook-shaped cross-section adapted to hookably engage the incoming truck and is capable of resiliently flexing between a hook-shaped cross-section in the disengaged position and a substantially straight cross-section in the sealing position in response to the truck. The hook-shaped cross section permits the seal member to sealably engage the interior wall of the truck, and, in the alternative, will seal against the peripheral edge of the truck, or the exterior wall of the truck depending on the size and position of the truck. The flexible seal member has a seal end adapted to bend and conform to the surface contours of the truck surface in the sealing position so as to form a substantially air-tight seal therewith.

34 Claims, 9 Drawing Sheets

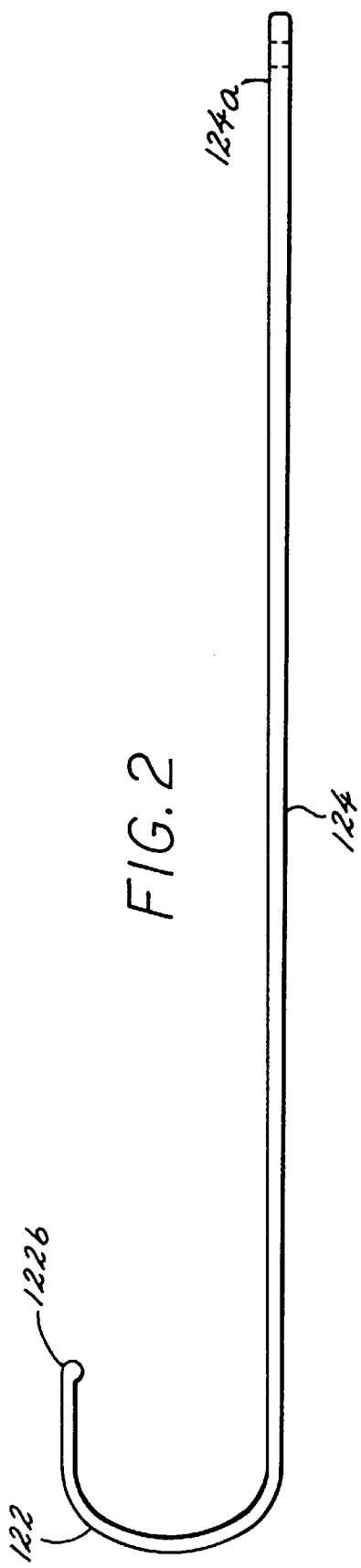

LOADING DOCK SEAL ASSEMBLY

This is a continuation of copending application Ser. No. 08/116,870 filed on Sep. 3, 1993 now abandoned which is a continuation-in-part application of U.S. application Ser. No. 08/079,145, filed on Jun. 17, 1993 now U.S. Pat. No. 5,394,662.

FIELD OF THE INVENTION

The present invention relates generally to loading dock seals and shelters and, more particularly, to a sealing device for engaging the cargo portions of a truck adjacent to a loading dock.

BACKGROUND OF THE INVENTION

Trucks having open rear cargo bays are typically backed into alignment with a loading dock or other doorway to facilitate loading and unloading of the vehicle. A significant space is typically formed between the truck and the building which exposes the interiors of the building and the truck, and the workers and materials to the outside environment during loading and unloading. Attempts to seal the gap have included loading dock shelters and loading dock seals.

Conventional loading dock seals utilize resilient, compressible pad members, generally disposed at the lateral and top edges of the opening. The pad members are typically covered with coated fabric, vinyl or other similar coverings for protection and appearance. A seal is obtained by the engagement of the exterior walls or rear edges of the cargo bay of the truck directly against the seal. Loading dock seals are generally desirable when the incoming trucks are of a predictable size and configuration, and the seal may be placed so that it will routinely engage all portions of the rear or side of the incoming truck. Since many conventional dock shelters have rigid frames or portions of frames, they have been subject to impact damage from the trucks. Attempts to provide hinged or compressible frames have not been entirely satisfactory because they are still subject to damage, are relatively difficult to maintain and increase manufacturing costs. Similarly, the metal protective bumpers are expensive and cumbersome to install. Since many loading docks have inclined driveway grades, many loading dock shelters must be individually manufactured in order to accommodate such grades and maintain the proper perpendicular orientation between the truck walls and the curtains which also increases manufacturing costs.

Many conventional dock seals, dock shelters, and combined dock seals and shelters are relatively difficult to maintain. The compressible pads require the truck to exert considerable force on the pad and the building wall in order to obtain the proper sealing engagement, increasing abrasion and wear on the seal, particularly where the rear corners and edges of the truck rub against the material. The curtain in the dock shelter is similarly subject to wear and abrasion. They have also been unable to accommodate uneven truck surfaces, projecting hinges and the like and thus, have been unable to create an air tight seal.

Although it is desirable to seal the truck and the dock opening to prevent the escape of heated or air conditioned air during inclement weather, it is undesirable to do so during mild weather. Unfortunately, the seals and the curtains are typically disposed about the dock opening such that they can not be removed or adjusted to unseal the opening in such mild weather.

OBJECTS AND SUMMARY OF THE INVENTION

It is an object of the present invention to provide an improved sealing device for engaging a truck parked at a loading dock.

Another object of the present invention is to provide a loading dock sealing device which is capable of sealing against an interior wall of a truck, and, in the alternative, will seal against the exterior wall or the rear peripheral edge of the truck depending on the size and position of the truck, and thus increase the likelihood of a good seal.

It is an object of the present invention to provide a loading dock sealing device which sealingly engages the uneven surface configurations of the truck.

A related object of the present invention is to provide a loading dock sealing device which closely conforms to the truck surface resulting in minimal obstruction of the cargo bay opening during loading and unloading.

A further object of the present invention is to provide a sealing device capable of sealing the hinge gap formed between the side walls of a truck and its hinged open doors.

It is another object of the present invention to provide a loading dock sealing device which automatically engages the truck in response to the rearward movement of the truck.

Still another object of the present invention is to provide a loading dock sealing device which sealably engages the truck over a wider range of truck body widths, driveway inclines, or off-center or skewed positioning of the truck body.

It is an object of the present invention to provide a sealing device which functions in an efficient and practical manner, is easily and economically fabricated, and is adapted for operation with vehicles of various widths and heights.

It is an object of the present invention to provide an improved combined dock seal and shelter which provides good sealing engagement with trucks of different widths when they are properly and improperly aligned.

Another object of the present invention is to provide an improved combined dock seal and shelter for engaging a truck parked at a loading dock.

A further object of the invention is to provide a combined dock seal and shelter which may be selectively adjusted or removed to provide outside ventilation.

It is another object of the present invention to provide a combined dock seal and shelter capable of eliminating the use of steel bumpers customarily required with shelters.

A loading dock shelter having a resilient and flexible seal assembly is provided for forming an air blocking seal or a substantially air-tight seal between the dock opening and the truck. The seal assembly is flexibly mounted on each side of the dock opening for movement between disengaged and sealing positions in response to movement of the truck into and out of the loading dock. In the disengaged position, the seal assembly is spaced outwardly from the building wall and the loading dock so that it does not interfere with the normal operation of the loading dock. The seal assembly also projects into the path of the incoming truck so that the rear peripheral edges of the incoming truck engage the seal assembly.

In one embodiment, the seal assembly comprises a thin-walled, resilient, and flexible support or panel member and a seal member. The support member, which is adapted to attach to the loading dock frame and to support the seal member, has a substantially straight cross-section in the disengaged position which is capable of resiliently flexing to an arcuate-shaped cross-section orientated towards the dock opening in the sealing position in response to the truck.

The seal member has a substantially hook-shaped cross-section adapted to hookably engage the peripheral edge of the incoming truck. It is capable of resiliently flexing between its hook-shaped cross-section in the disengaged position and a substantially straight cross-section in the sealing position in response to the truck. The hook-shaped cross section permits the seal member to sealably engage the interior wall of the truck or the peripheral edge or exterior wall of the truck if the truck's position is off-center or skewed or if the truck's size is atypical. The seal member has a seal end adapted to bend and conform to the surface contours of the truck surface in the sealing position so that it forms an air-blocking seal or a substantially air-tight seal with the truck surface.

In another embodiment, the seal assembly may be formed in separate sections of different stiffness joined together to provide optimum strength and flexibility over the length of the seal assembly. It is preferable that the support member is stiffer than the seal member so as to provide adequate support for the seal assembly and to resist collapse or sagging of the seal assembly whereas the seal member is relatively flexible so as to give the seal assembly a soft sealing end adapted to sealably engage the truck surface. The flexibility or stiffness of the individual support and seal members may be varied along their respective lengths to provide the desired degree of flexibility and strength at different lateral positions in the seal assembly.

A combined loading seal and shelter is also provided comprising a pad member disposed along either side of the dock opening and adapted to form an air-blocking seal with the peripheral edges of a truck. A sealing device such as the flexible seal assembly previously described or a conventional curtain member may be attached to the pad member to engage the walls of the truck and form a seal therewith when the truck is parked between the seal members. In one embodiment, the seal assembly and the curtain member are releasibly connected to the pad member to permit the seal assembly and the curtain member to be selectively released from the pad member using a hook and loop attachment device or similar methods.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 2 is an enlarged top plan view of one embodiment of the seal assembly of FIG. 1;

FIG. 3 is an enlarged top plan view of a second embodiment of the seal assembly of FIG. 1;

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
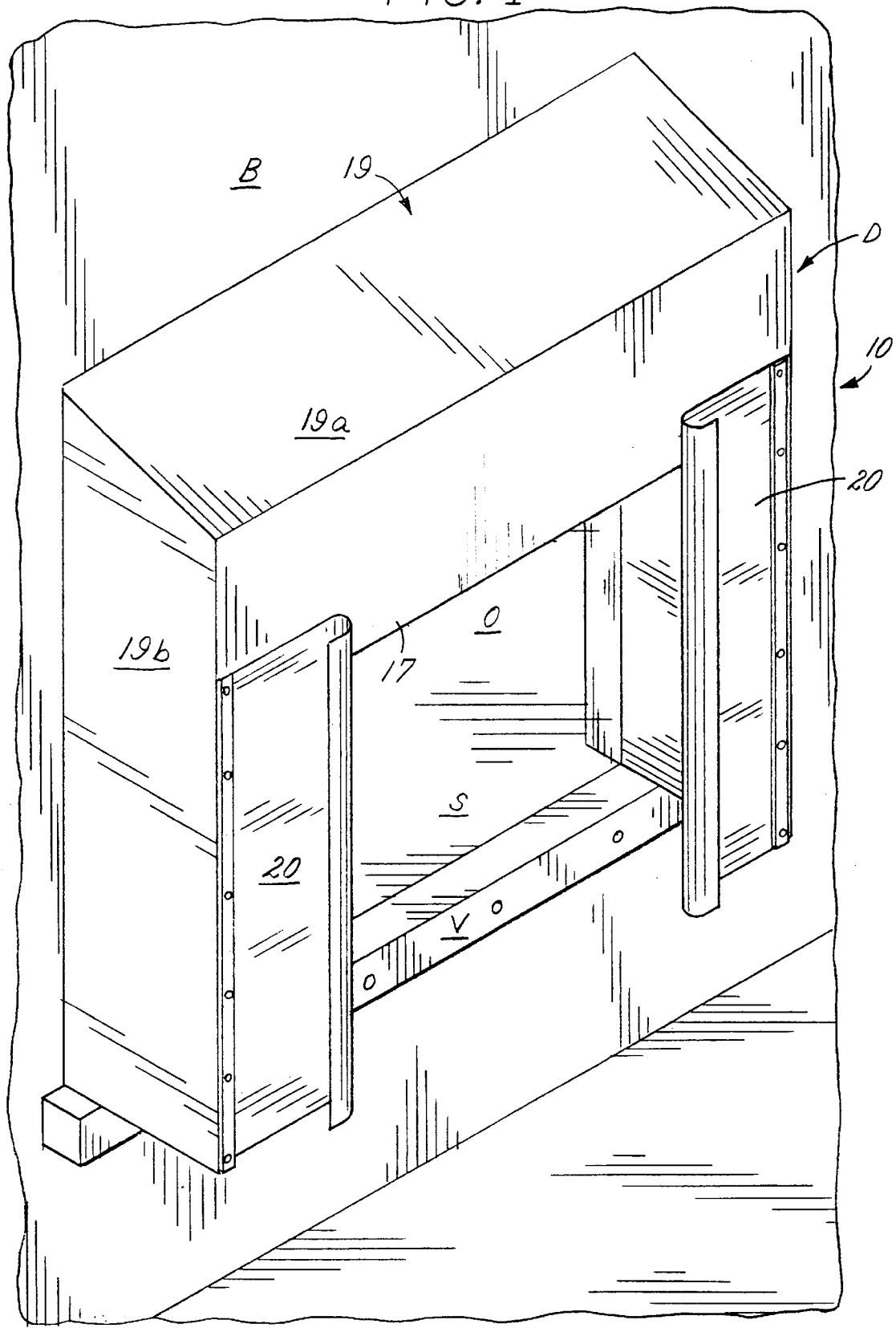
FIG. 1 is a perspective view of a loading dock opening and a loading dock shelter having a resilient seal assembly in accordance with the present invention.

Referring to the drawings and more particularly to FIG. 1, one embodiment of a loading dock shelter 10 having a seal assembly in accordance with the present invention is mounted adjacent a conventional loading dock D normally provided in warehouses, truck terminals, manufacturing plants and the like where raw materials and products are received and/or dispatched by trucks 14.

Figure 5:
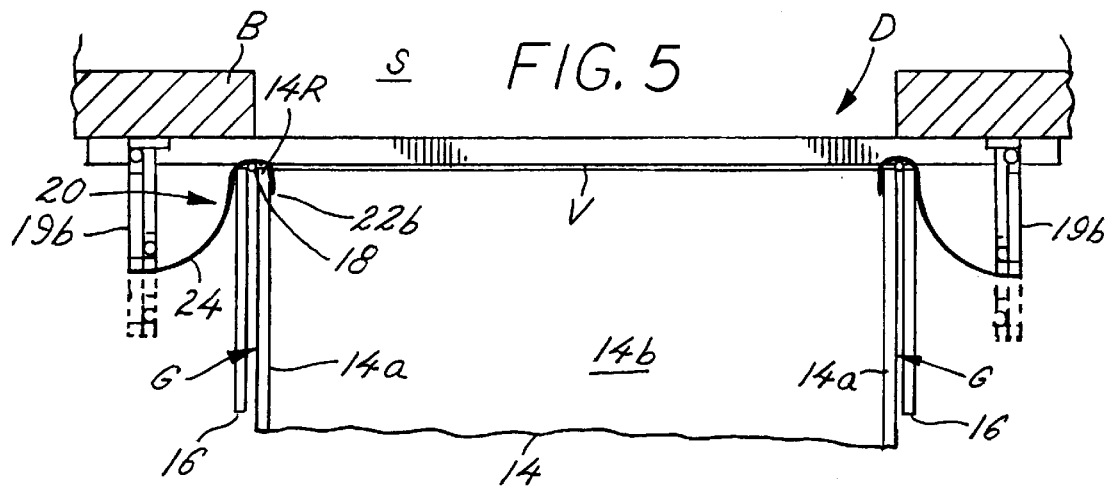
FIG. 5 is a top plan view of the loading dock shelter of FIG. 1 showing the seal assembly in a sealed position for sealably engaging the cargo door of a truck parked in loading dock.
Figure 6:
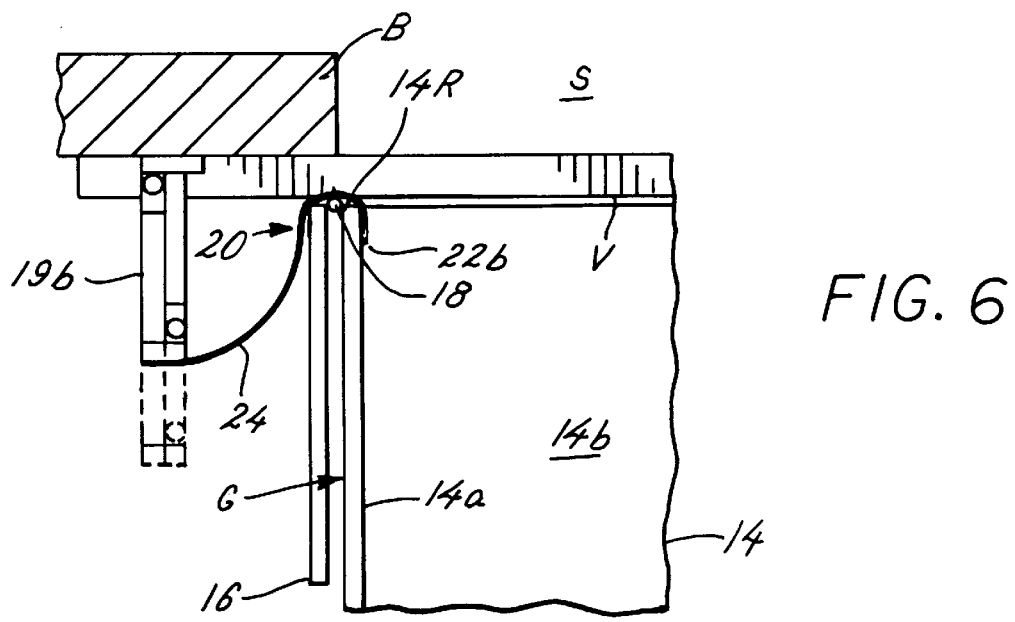
FIG. 6 is an enlarged view of FIG. 5 showing the seal assembly sealing the interior wall of the truck and about the rear peripheral edge of the hinge type door disposed adjacent and parallel to the exterior wall.
Figure 8:
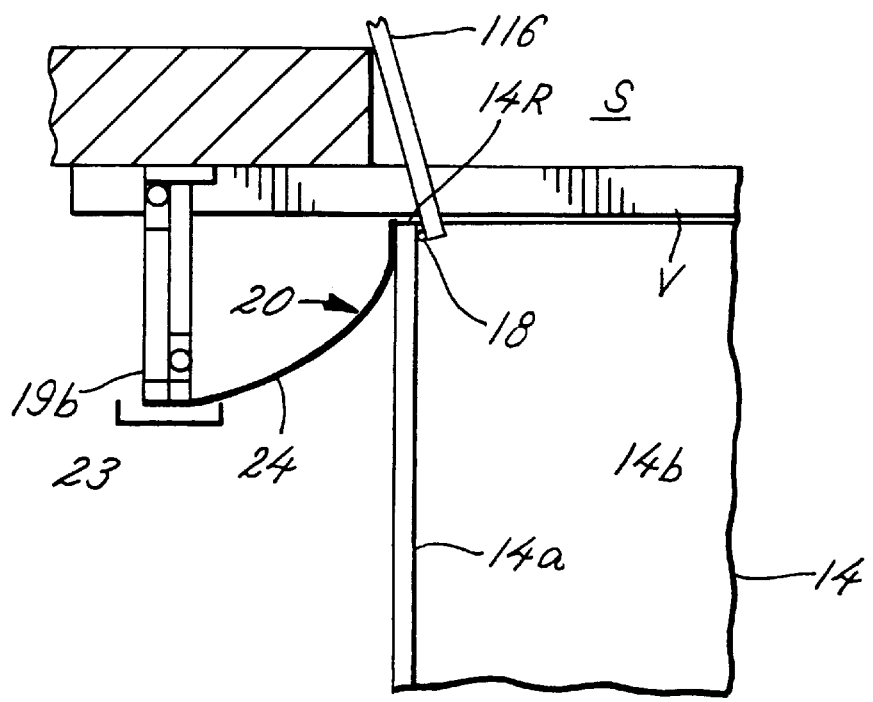
FIG. 8 is an enlarged top plan view showing the seal assembly sealing along the exterior wall of the truck having an inwardly opening door.

Referring to FIG. 5, the truck 14 will have a cargo bay defined by side walls 14a, truck bed 14b, a front wall (not shown), a ceiling (not shown) and a door 16 which extends laterally across the rear of the truck 14 in the closed position. In many trucks, the doors 16 will pivot between the closed position and an open position wherein they are substantially adjacent and parallel to the exterior truck walls 14a and form a gap G between the door 16 and the wall 14a as shown in FIGS. 5–6. In other trucks, the doors 16 will pivot inwardly into the loading dock opening O as shown in FIG. 8 or slide upwardly to the cargo ceiling (not shown). It will be appreciated that the truck 14 may have hinges 18, handles, hooks or the like projecting from the rear peripheral edge 14R of the truck 14. The rear peripheral edge 14R is generally defined by the rear vertical edge of the truck walls 14a.

Figure 9:
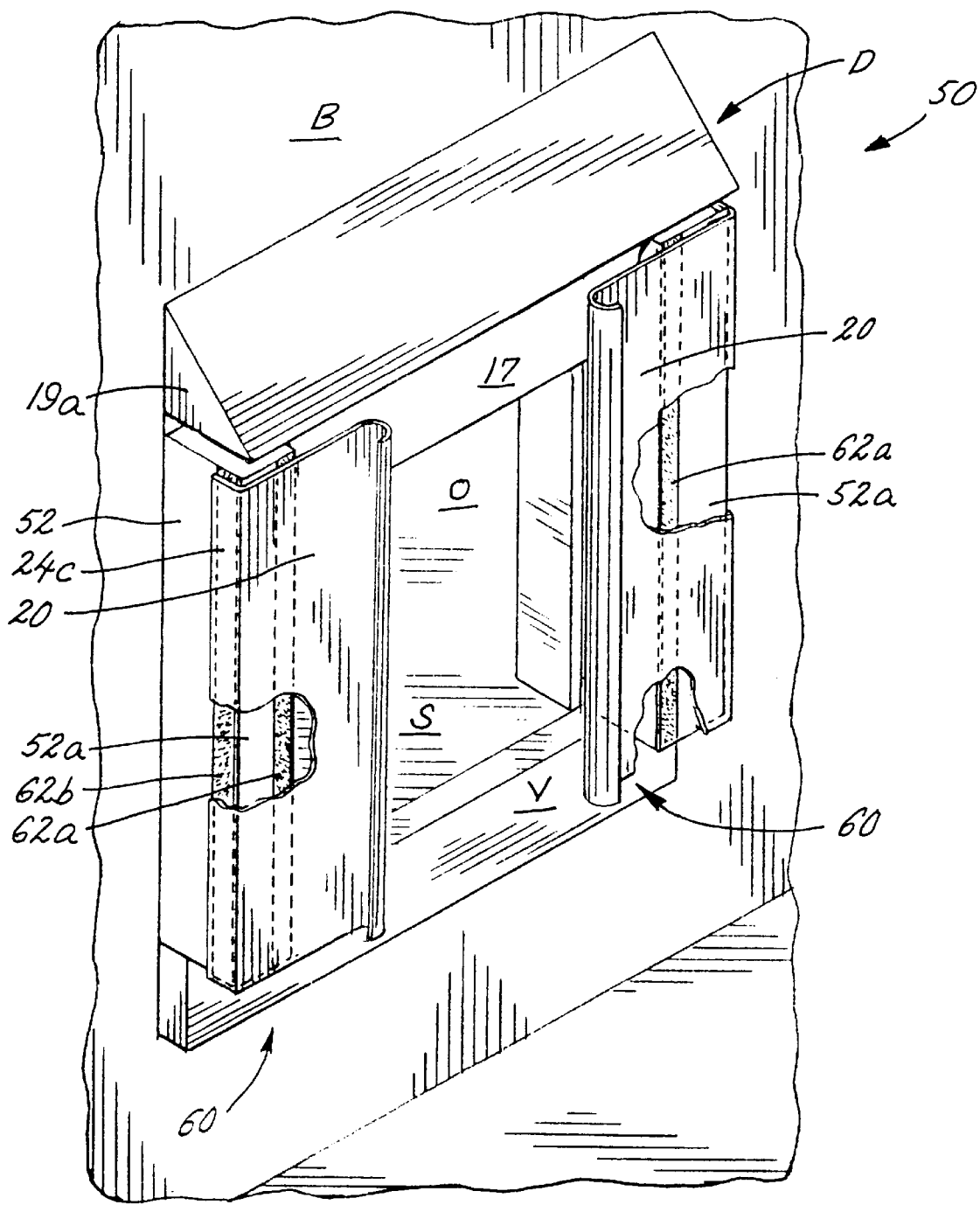
FIG. 9 is a perspective view, partially broken away, of one embodiment of the combined dock seal and shelter of the present invention mounted relative to the doorway of a loading dock.
Figure 15:
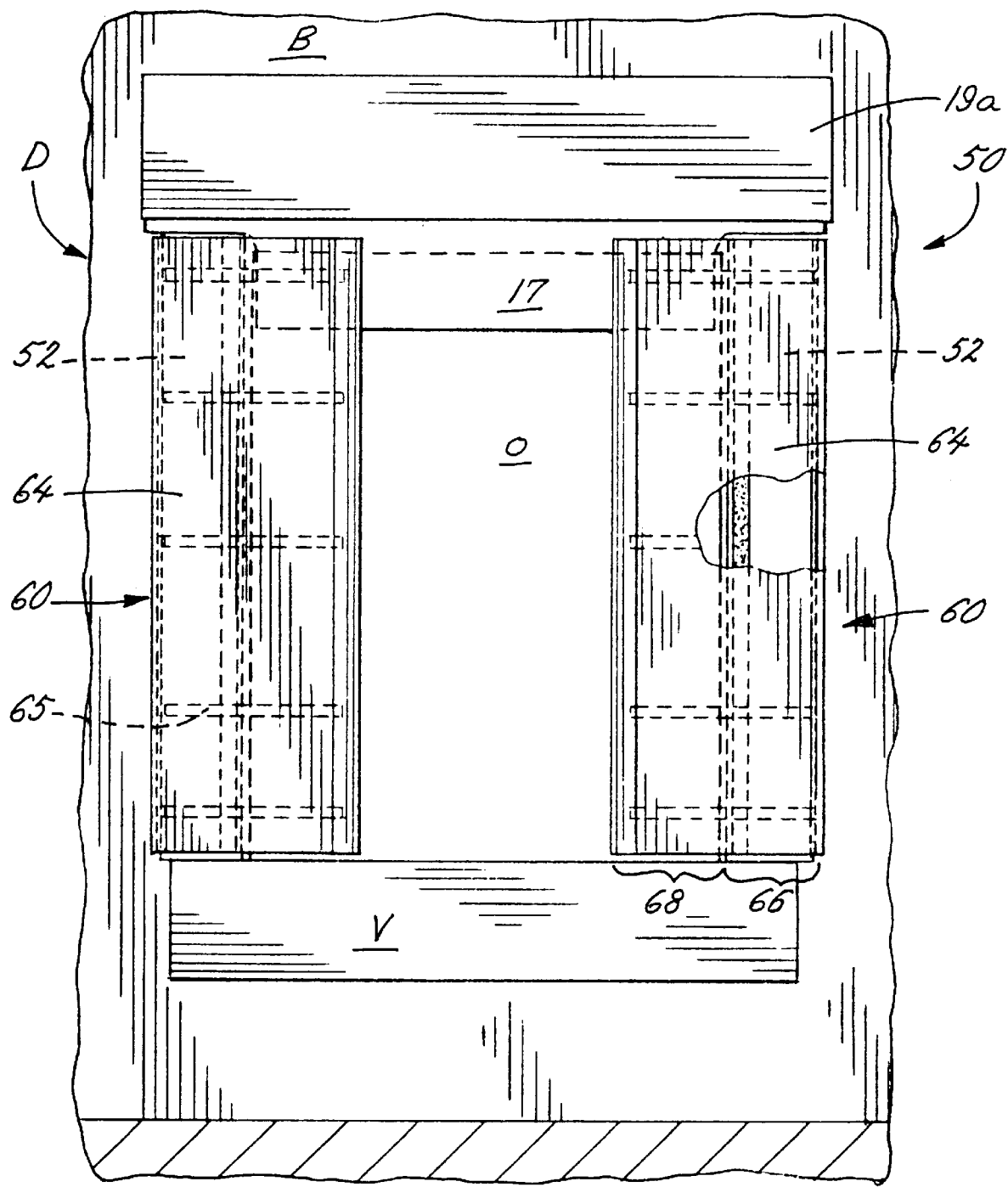
FIG. 15 is a front elevational view, partially broken away, of the combined dock seal and shelter having a curtain member.

Referring to FIGS. 1, 9 and 15, the conventional loading dock D normally has a dock opening O in a building wall B and a horizontal surface or deck S over which loading equipment such as forklift trucks and the like and dock personnel maneuver during the loading and unloading operation. The dock D may be provided with a leveler assembly (not shown) which is adapted to compensate for height differentials between the deck S and the upper supporting surface of the truck bed. The leveler assembly is customarily disposed within a pit (not shown) subjacent the deck S of the dock D and is well known in the art. In addition, the dock D normally includes a vertical wall V or surface against which the rear end of the truck 14 abuts during the loading and unloading operations. The surface V may be provided with suitable bumpers or fenders (not shown) which are engaged by the rear of the truck 14 thereby preventing damage or defacement of either the dock D, the frame assembly 19, or the truck 14 when the truck 14 is backing into position. The loading dock shelter 10 is intended to effectively and readily provide an air-blocking seal or a substantially air-tight seal between the dock opening O and the truck 14 to prevent the movement of air between the inside and outside of the building B during the loading and unloading operation.

In the embodiment illustrated in FIGS. 1–8, the loading dock shelter 10 comprises a frame assembly 19 rigidly attached to the periphery of the dock opening O, a seal assembly 20 mounted to the frame assembly 19 on each side of the dock opening O, and a curtain member 17 pivotally attached to the top of the frame assembly 19 to seal the gap formed between the top of the truck 14 and the frame assembly 19. As is conventional, the curtain member 17 may be disposed inside the seal assembly 20 as shown in FIG. 1 or outside the seal assembly 20 (not shown).

As shown best in FIG. 1, the conventional frame assembly 19 comprises a header frame 19a disposed along the top of the dock opening O and two side frames 19b projecting downwardly from the ends of the header frame 19a along the lateral edges of the opening O. As will be appreciated by those skilled in the art, the side frames 19b of loading dock shelter 10 may utilize a rigid frame structure (not shown) or a retractable or compressible frame, or any other frame structures capable of supporting the seal assembly 20. A conventional compressible frame 19 has an extended position projecting into the path of the incoming truck 14 (shown in FIG. 4 and in phantom in FIGS. 5–6) and a retracted position in which the frame retracts inwardly towards the dock opening in response to the inward movement of the truck 14 (shown in FIGS. 5–6). Steel bumpers 23 are typically attached to the loading dock to prevent impact damage to the frame 19 by the truck 14. As shown best in FIG. 1, the frame assembly 19 may be secured to the wall B by suitable means such as bolts or the like. The frame assembly 19 extends outwardly from the wall B for providing a generally rigid structure capable of supporting either the seal member 20, the overhead curtain 17, or both in a spaced relation from the wall B. Thus, unlike many conventional loading dock seals and shelters, it is not necessary that the loading dock shelter 10, the seal members 20, or the curtain 17, project into the dock D or truck openings, thereby minimizing or eliminating any interference with the loading/unloading operation.

In accordance with certain objects of the present invention, a seal assembly 20 is resiliently and flexibly mounted along each lateral side of the dock opening O so that the truck 14 may fit between the two seal assemblies 20 and a seal may be formed between the truck 14 and the seal assembly 20 when the truck 14 is parked adjacent the loading dock D for loading/unloading. Although the embodiments illustrate two seal assemblies 20 disposed on either side of the dock opening O, it will be appreciated that, in other embodiments (not shown), only one seal assembly 20 may be utilized or a seal assembly 20 may be disposed in a substantially horizontal orientation at the top of the frame assembly 12a so as to sealably engage the top of the truck 14. Since each seal assembly 20 is identical in construction, only one seal assembly 20 is described below.

Figure 4:
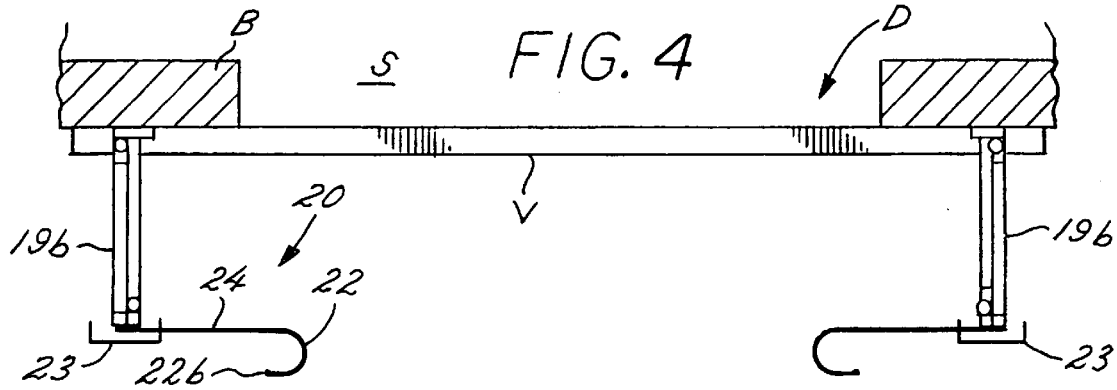
FIG. 4 is a top plan view of the loading dock shelter of FIG. 1 showing the seal assembly in the disengaged position for receiving a truck.

The seal assembly 20 resiliently flexes between a first, disengaged or open position (as shown in FIGS. 1 and 4) and a second, engaged or sealing position (as shown in FIGS. 5–8) in response to the movement of the truck 14 into and out of the loading dock D. In the disengaged position as shown in FIG. 4, the seal assembly 20 is spaced outwardly from the wall B and the loading dock D so as not to interfere with the normal operation of the loading dock D and so as to project into the path of the truck 14 so that the rear peripheral edge 14R of the truck 14 may engage the seal assembly 20 as the truck 14 backs into the loading dock. After the truck 14 initially engages the seal assembly 20, the rearward movement of the truck 14 resiliently bends the seal assembly 20 from the disengaged position (as shown in FIGS. 1 and 4) to the sealing position (as shown in FIGS. 5–8). In the sealing position, the seal assembly 20 is adapted to sealably engage and substantially conform to the contours of the interior surface of the truck wall 14a, so that it does not block or otherwise interfere with the normal loading/unloading of the truck 14 and loading dock D unlike many conventional seals. If engagement of the interior wall is not achieved because of the size or position of the truck, the seal assembly will, in default, conform to the contours of the rear peripheral edge 14R or the exterior surface of the truck wall 14a.

The seal assembly 20 comprises a thin-walled seal member 22 and a support or panel member 24 which may be formed as an integral and unitary assembly or as a plurality of separate elements. In the embodiment illustrated in FIG. 3, for example, the seal and panel members 22, 24 are formed of two separate elements which are attached together by a plurality of bolts 26 or the like whereas the seal and panel members 22, 24 are formed as a single integrally extruded assembly in the embodiment illustrated in FIG. 2. It is preferable that the vertical length of the seal assembly 20 be sufficient to engage and seal substantially the entire length of the truck wall 14a.

In the illustrated embodiments, the seal member 22 preferably has a generally thin-walled, hook- or U-shaped cross-section although it may have any other desired shape or size adapted to sealably engage the surface of the truck 14. Referring to FIG. 3, it will be seen that the seal member 22 has a first or mounting end 22a which is adapted to be attached to the support member 24 without sagging or collapsing and a second or sealing end 22b which is adapted to sealably engage the truck walls 14a and create a substantially air tight seal between the seal member 22 and the truck surface.

Figure 7:
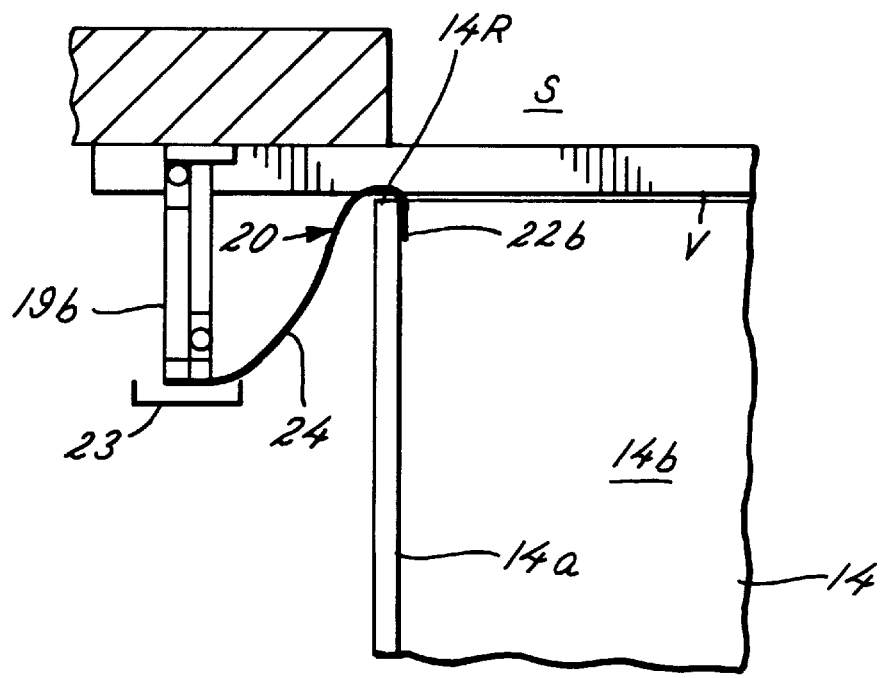
FIG. 7 is an enlarged top plan view showing the seal assembly sealing along the interior wall of the truck wall.

The seal member 22 may resiliently flex between the disengaged and sealing positions in response to the movement of the truck 14. In the disengaged position, as illustrated in FIG. 4, the hook-shaped seal member 22 is generally spaced intermediate the dock opening O and the incoming truck 14 so as to hookably engage the peripheral edge 14R of the incoming truck 14. In response to the rearward movement of the truck 14 towards the dock opening O, the seal end 22b resiliently bends and conforms to the surface contours of the truck 14. The resilient and flexible nature of the sealing end 22b permits the seal member 22 to accommodate projecting hinges 18 and the like. The shape of the seal member 22 in the sealing position will depend on the surface contours of truck. It is preferable the U-shaped seal member 22 be sufficiently wide so that the sealing end 22b can hookably engage the interior surface of the truck walls 14a. It has been found that spacing the mounting and sealing ends 22a, 22b apart by about 4 inches is sufficient to permit the seal member 22 to hookably engage the interior walls 14a of most types of trucks 14. Although it is preferable that the seal member 22 maintain its U-shape so as to hookably engage the interior surface of the truck wall 14a (as shown in FIG. 7), the seal member 22 may flex between the initial U-shape in the disengaged position and a substantially straight shape in the engaged position (as shown in FIG. 8). The seal member extends to a substantially straight cross-section, for example, when the peripheral edge 14R is positioned too far rearwardly or when the truck is parked on an incline or is off-center or skewed relative to the loading dock D. The seal member 22 is also flexible along its vertical length which permits the sealing end 22b to conform to and accommodate uneven truck surfaces, such as projecting hinges 18, or a truck parked on an incline in contrast to many conventional seals which have relatively rigid and flat seal surfaces which leave an air space between the seal member 22 and the truck 14. Thus, the seal member 22 will form a substantially air-tight seal with the truck regardless of truck's shape, size or orientation relative to the loading dock D.

The panel or support member 24 is a generally straight, curtain-like member which has a first lateral edge 24a adapted to be attached to the frame assembly 12 and a second lateral edge 24b adapted to receive the seal member 22. The panel member 24 may be made of any material having sufficient structural integrity to withstand the stresses and forces exerted on the support member 24 when the truck 14 impacts the seal assembly 20 and bends the seal assembly 20 between the disengaged and sealing positions. The support member 24 may be attached to the seal member 22 or the frame assembly 19 by any method known to those skilled in the art including, for example, bolts, screws, hook and loop fasteners and the like. The support member 24 is flexible and bends between the disengaged position (shown in FIG. 4), in which the support member 24 is generally straight and parallel to the building wall V and the sealing position (shown in FIGS. 5–8) in which the support member 24 flexes to a generally arcuate shape orientated towards the building wall V. The ability of the panel member 24 to flex and bend in response to the truck impact permits the present seal assembly 24 to be mounted to a rigid frame assembly without the need for a collapsible frame assembly required by earlier technology. Of course, the seal assembly 22 of the present invention may be mounted on a collapsible frame assembly, if desired, as is illustrated in FIGS. 4–8.

The seal assembly 20 may be made of any material including, for example, synthetic and natural rubbers, elastomers or polymers, having the desired characteristics as will be obvious to those skilled in the art. The material is preferably abrasion resistant and will be flexible but still have sufficient structural integrity so that it will not collapse or sag. A material which has been found to be suitable for fabricating the seal member 22 is ethylene propylene rubber having a durometer from about 80 to about 90 Shore A and preferably at about 85 Shore A and will meet most requirements for typical loading dock shelter and truck applications. It has been found that a seal member 22 having cross section of about ¼ inch will have the requisite structural integrity to withstand the truck impact while still having the necessary flexibility to sealably engage the truck surfaces. It will be appreciated that such a thin walled structure minimizes or eliminates obstruction of the cargo bay's doorway.

The support member 24 is fabricated of conventional coated fabrics (such as Hypalon, Neoprene or vinyl) and reinforcing stay members as is known to those skilled in the art. The support member 24 may also be fabricated from the same elastomeric materials as the seal member 22, or from conventional foam materials such as polyurethane foam. It will be appreciated that the seal member 22 may be attached to the compressible foam pads found in existing dock shelters and seals.

It is generally desirable that the support member 24 is relatively stiffer so as to provide adequate support for the seal assembly 20, to resist collapse or sagging and to otherwise withstand the impact of the truck 14 whereas the seal member 22 is relatively flexible so as to give the seal assembly 20 a soft seal end 22b adapted to sealably engage the truck surface. Thus, in the embodiment illustrated in FIG. 2, the seal assembly 20 may be formed in separate sections of different stiffness joined together to provide optimum strength and flexibility over the length of the seal assembly 20. The respective support and seal members 22, 24 may also be fabricated of a material having a uniform durometer or it may be fabricated of different blends of materials selected to provide a variable durometer providing the desired degree of flexibility or strength along the length of each portion. The seal member 22 may be fabricated, for example, by a conventional extrusion process such that the flexibility varies along its length wherein the first end 22a is relatively stiff to provide a stronger attachment end and the second end 22b is relatively flexible to permit the seal member 22 to more readily conform to the contours of the truck surface.

Instead of separate seal and support members 22, 24, as shown in FIG. 3, the seal assembly 20 may also be formed by an extrusion process to provide an integral seal and support member 122, 124, as shown in the embodiment illustrated in FIGS. 5–8. As in the first embodiment, the first end 124a of the panel 124 is attached to the frame assembly 12a and has enough structural integrity to support the seal assembly 20 whereas the seal end 122b is relatively flexible so as to resiliently and sealably engage the truck surfaces.

Since the seal assembly 20 has a thin walled structure, especially relative to conventional compressible pad seals, and also due to the ability of the seal assembly 20 to bend or deform to conform to the surface contours of the truck surface, it should now be appreciated that the seal assembly 20 minimizes any obstruction to the passageway between the loading dock D and the cargo bay. By covering the projecting hinges 18 or other projections on the peripheral edge of the cargo bay, the seal assembly 20 also protects the workers.

In order to operate the loading dock shelter 10 and the seal assembly 20, the truck 14 backs into the loading dock D in a conventional manner. The seal assembly 20 is initially in the first or disengaged position as illustrated in FIG. 4 so that it projects into the rearward path of the truck 14. As the truck 14 backs into the loading dock D as shown in FIG. 5, the rear peripheral edge 14R of the truck 14 initially engages the panel member 24. The rearward movement of the truck 14 bends the panel member 24 from its straight extended orientation in the disengaged position to an arcuate-shaped orientation in the sealing position. The rear peripheral edges 14R of the truck 14 engage the seal member 22 in response to the rearward movement of the truck 14. The flexible sealing end 22b of the seal member 22 will engage, bend and conform to the contours of the truck surface.

The versatility and effectiveness of the seal assembly 20 is exemplified by the seal member's ability to seal along the interior wall of the cargo bay, along the lateral peripheral edge of the cargo door, or along the exterior wall or along the open door of the truck 14 depending on the specific type, size and position of a truck which enters the loading dock D.

In the truck illustrated in FIGS. 5 and 6, the doors rotate outwardly so that they are substantially adjacent and parallel to the exterior walls and a hinge gap G is formed between the door 16 and the truck wall 14a in the open position. The hinge 18 pivotally connects the door 16 and the truck 14 and typically projects from the peripheral edge 14R. The seal assembly 20 hookably engages the peripheral edge 14R of the cargo bay as the truck backs into the loading dock and the seal member 22 sealably engages the interior wall of the truck. Although the seal member 22 preferably seals against the truck's interior surface to maximize the effectiveness of the seal, it may also seal against the peripheral edge 14R or exterior wall of the truck, depending, for example, on the size, type, and position of the truck. It will be appreciated that the seal member 22 seals about the gap G. The flexibility of the seal member 22 also enables the seal assembly 20 to bend around the hinge 18 and seal against the surfaces surrounding the hinge 18. By conforming to the contours of the truck surface, an effective seal is created in contrast to conventional rigid and flat-surfaced seals which are unable to accommodate the uneven surface configurations such as the hinge 18, and, thus, leave air gaps between the seal surface and the truck surface.

Referring to FIG. 7 which illustrates a truck 14 having rear doors which open by sliding upwardly into the ceiling (not shown), it will be seen that the seal assembly 20 engages the interior wall 14a of cargo bay of the truck 14 or the peripheral edge 14R, or both, of the cargo door. The seal member 22 bends and substantially conforms to the surface contours of the interior wall 14a and/or the peripheral edge 14R of the cargo bay. By sealably engaging the truck surface, regardless of the truck's surface configuration, the seal member 22 maximizes the contacting surface area and, thereby, maximizes the seal effectiveness.

And finally, in a truck 14 having rear doors 16 which open inwardly toward the building as shown in FIG. 8, or when the truck backs too far into the shelter opening O, or the truck is parked on an incline or off-center such that the seal assembly 20 cannot sealably engage the interior wall, the seal assembly is capable of bending from its initial U-shape to a substantially straight shape so as to sealably engage the exterior wall of the truck 14.

In accordance with certain objects of the present invention, a combined loading dock seal and shelter 50 is provided. The embodiment of the combined dock seal and shelter 50 illustrated in FIGS. 9–17 comprises side seal members or pad members 52 which are mounted to opposite sides of door opening O in a conventional manner. The conventional side pad member 52 comprises a flexible, resilient and compressible pad-like core 54 and preferably a cover 56 made of flexible durable waterproof material. The pad member 52 is elongated and substantially extends along the entire length of opening and is adapted to receive the rear peripheral edge 14R of an incoming truck 14 and to form an air-blocking seal therebetween. In the illustrated embodiment, the pad member 52 has a rectangular cross section defined by planar sides 52a, 52b, 52c, 52d, but may have triangular, circular, oval or other cross-sections which will be known to those skilled in the art. The pad member 52 is preferably fabricated of polyurethane foam, but may be of any other suitable material capable of providing the desired characteristics which is well known to those skilled in the art. The cover 56 is preferably fabricated from a durable and abrasion resistant material known under the trademark HYPALON, but may be of any other conventional material which is suitable and durable, such as vinyl, rubberized fabric, or the like.

The combined dock seal and shelter 50 also comprises a sealing device 60 attached to each side pad member 52 and adapted to project into the path of the truck 14 and form an air-blocking seal therewith. The sealing device 60 is preferably connected to the side pad member 52 so that the sealing device 60 may be selectively removed, if desired, such as when the exterior weather conditions are favorable. It may also be desirable to remove the sealing device 60 when the incoming truck 14 has a configuration capable of directly engaging the side pad member 52 and the presence of the sealing device 60 would be redundant or interfere with loading or unloading. Similarly, the sealing device 60 may be selectively reattached to the side pad member 52 in the event of adverse weather conditions or if the truck 14 is relatively narrow and unable to engage both of the opposing pad members 52. It will be appreciated that the removable nature of the sealing device 60 will reduce wear on the sealing device 60 and prolong its life.

In the embodiment illustrated in FIGS. 9–17, the sealing device 60 is selectively attached to the pad member 52 using a conventional hook and loop attachment device 62 commonly referred to as Velcro fasteners. The loop portion of attachment device 62 may be attached to one of the sealing device 60 or the pad member 52 and the latch portion attached to the other of the sealing device 60 or the pad member 52 wherein the latch and loop portions may latchably engage each other and attach the sealing device 60 to the pad member 52. The sealing device 60 and the pad member 52 may be selectively released by pulling the hook and loop portions apart.

The size, number and location of the attachment devices 62 may be adjusted to provide the proper support for the sealing device 60. For illustrative purposes in FIG. 9, a first attachment device 62b may be disposed along the vertical length of exterior side face 52b, a second attachment device 63c may be disposed between inner side face 52d and a tab member 53 attached along the lateral edge of the sealing device 60, a third attachment device 62a may be disposed along the vertical length of front face 52a.

It will be appreciated that the sealing device 60 may be releasibly connected to the pad member 52 using snap fasteners, zippers or other methods known to those skilled in the art. If desired the sealing device 60 may also be fixedly attached to the pad member 52 using stitching or other methods known to those skilled in the art which would permanently affix the sealing device 60 to the pad member 52.

Figure 12:
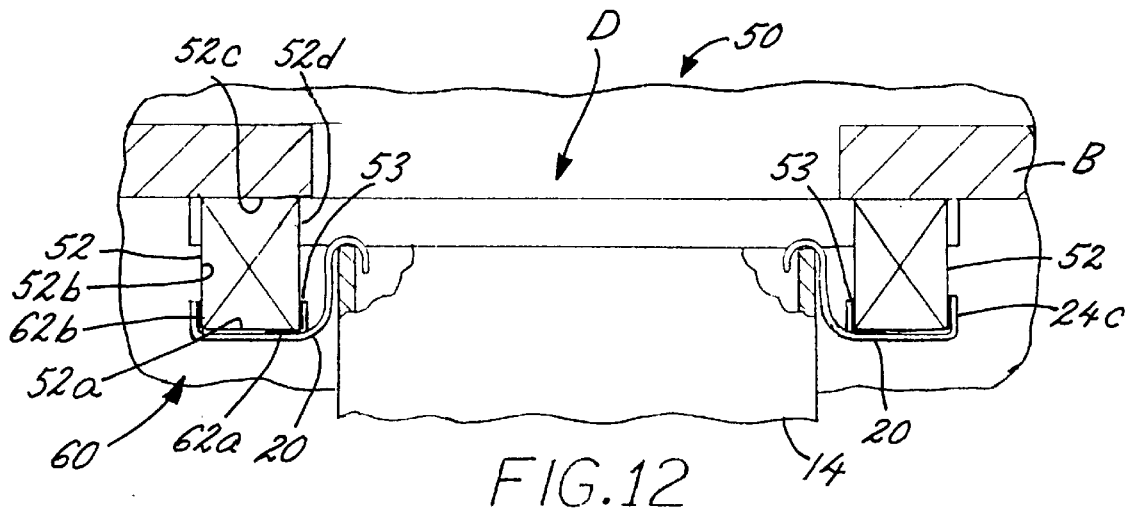
FIG. 12 is a top plan view of the loading dock shelter similar to FIG. 11 but showing the seal assembly in a sealed position for sealably engaging the cargo door of a truck parked in loading dock.
Figure 13:
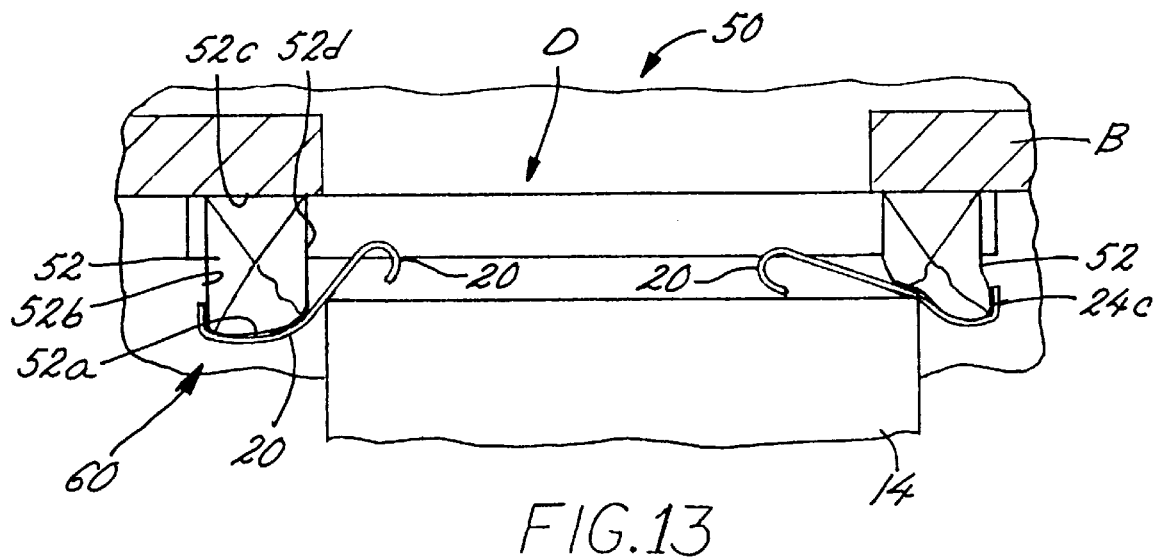
FIG. 13 is a top plan view of the combined dock seal and shelter of FIG. 9 showing the left seal assembly and the right pad member engaging the left and right sides, respectively, of a truck parked off-center in the loading dock.
Figure 14:
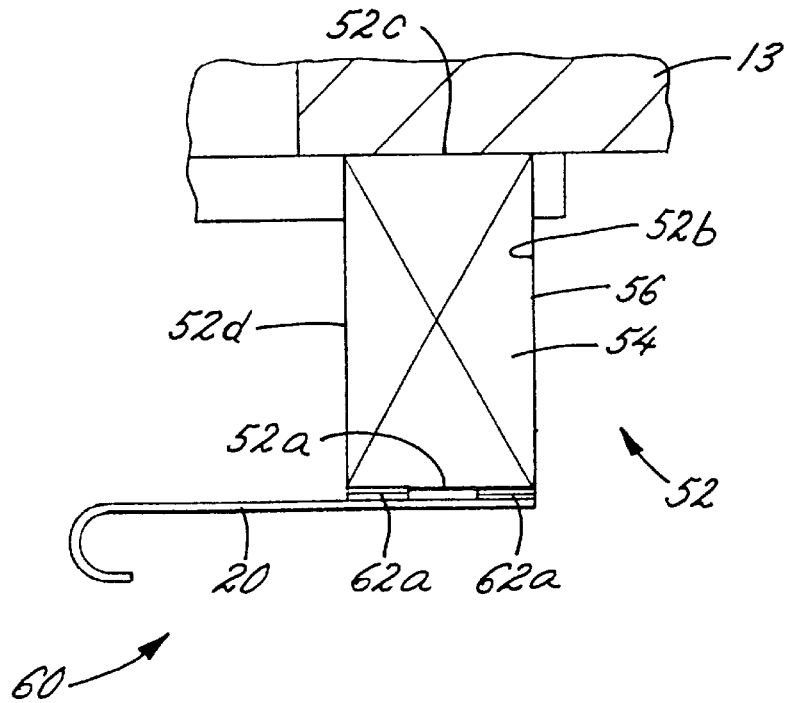
FIG. 14 is a top plan view of another embodiment of a seal assembly releasably attached to a front face of the pad member.

In the embodiment of the combined dock seal and shelter 50 illustrated in FIGS. 9–14, the sealing device 60 comprises the novel seal assembly 20. The first lateral edge 24b of the seal assembly 20 may be attached to the front face 52a of the pad member 52 as shown in FIG. 14 or the edge 24b may also have a lip 24c or tab 53 so that the seal assembly 20 may attachably engage the front face 52a or the side faces 52b, 52d of the pad member 52 as shown in FIGS. 9–14. In FIGS. 9–13, the edge 24b and the lip 24c each have at least one attachment device 62. In FIG. 14, the edge 24b has two attachment devices 62 at either side of the front face 52a.

Figure 16:
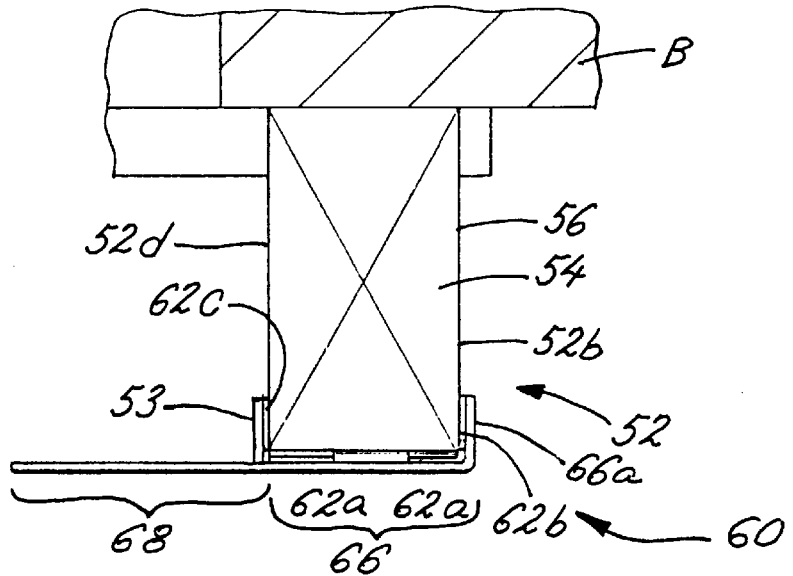
FIGS. 16 and 17 are top plan views of one embodiment of a curtain member releasably attached to the pad member in a disengaged and sealing position, respectively.
Figure 17:
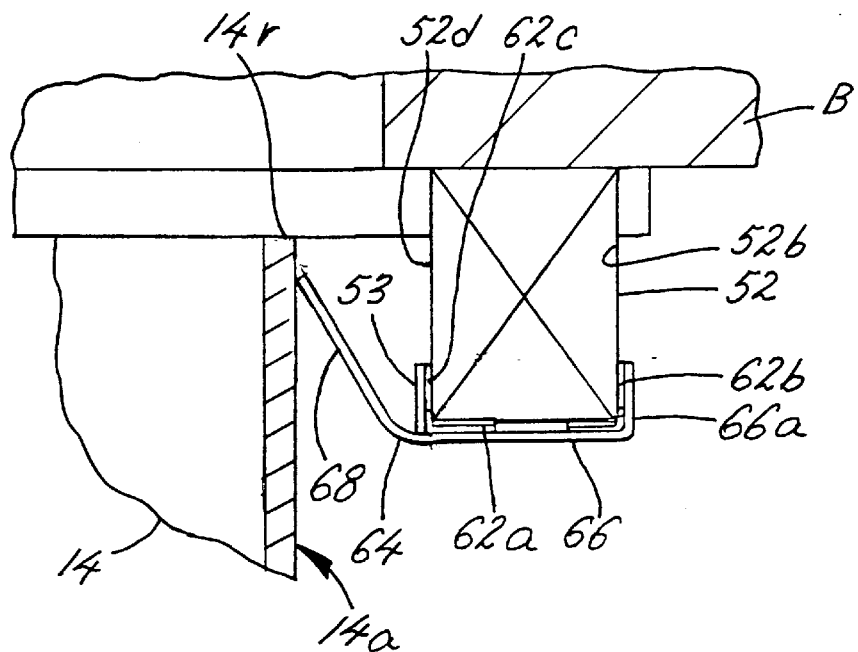

In the embodiment of the combined loading dock seal and shelter 50 illustrated in FIGS. 15–17, the sealing device 60 comprises a conventional curtain member 64. Referring to FIG. 15, it will be seen that the curtain member 64 is resiliently and flexibly mounted to the pad member 52 along each lateral side of the dock opening O so that the truck 14 may fit between the two spaced curtain members 64 and a seal may be formed between the truck 14 and the curtain members 64 when the truck 14 is parked adjacent the loading dock D for loading/unloading.

Referring to FIGS. 15–17, the curtain member 64 includes a first portion 66 attached to the pad member 52 and a second portion 68 which extends outwardly beyond pad member 52 into the path of the incoming truck 14 as best shown in FIG. 16. Like the seal assembly 20, the curtain member 64 is capable of resiliently flexing between a disengaged position projecting into the path of the incoming truck 14 (as shown in FIG. 16) and a second sealing position (as shown in FIG. 17) in response to the movement of the truck 14 into and out of the loading dock D. In the disengaged position, the curtain member 64 is spaced outwardly from the wall B and the loading dock D and projects into the path of the truck 14 so that the rear peripheral edge 14R of the truck 14 may engage the curtain member 64 as the truck 14 backs into the loading dock D. After the truck 14 initially engages the curtain member 64, the rearward movement of the truck 14 resiliently bends the curtain member 64 from the substantially straight disengaged position inwardly towards the dock opening O, to the sealing position. In the sealing position, the curtain member 64 is adapted to sealably engage and substantially conform to the contours of the exterior surface of the truck wall 14a. The curtain member 65 lacks a U-shaped seal member 22 of the seal assembly 20 and is, thus, incapable of engaging the interior wall 14a of the truck 14.

The curtain member 64 is preferably fabricated from a material known under the trademark HYPALON, but may be fabricated from fabric, vinyl, rubber or other durable material known to those skilled in the art. As is conventional, the curtain member 64 may have a plurality of substantially resilient stays 65 (shown in phantom in FIG. 15) or other supports which provide additional rigidity, lateral support and shape to the curtain member 64 and which may be embedded in the curtain member 64 or slidably inserted into pockets provided in the curtain member 64. The stays 65 will resiliently bias the curtain member 64 towards a substantially straight position as illustrated in FIG. 16.

The curtain member 64 may be releasibly and selectively connected to the pad member 52 in the same manner as described above in connection with the seal assembly 20. In FIGS. 15–17, the attachment devices 62 are disposed between the first portion 66 and the pad member 52. The first portion 66 may have a lip 66a or tab 53 adapted to engage the sides face 52b, 52d and an attachment device 62b therebetween.

The combined dock seal and shelter 50 may also include a head frame member 19a mounted above the doorway O. As previously described, the header frame 19a may have a sealing device 60 formed of the seal assembly 20 or the curtain member 64 disposed in a substantially horizontal orientation so as to sealably engage the top of the truck 14.

In order to operate the combined dock seal and shelter, the truck 14 backs into the loading dock D in a conventional manner. The sealing device 60 (the seal assembly 20 or the curtain member 64) initially projects into the rearward path of the truck 14.

Figure 10:
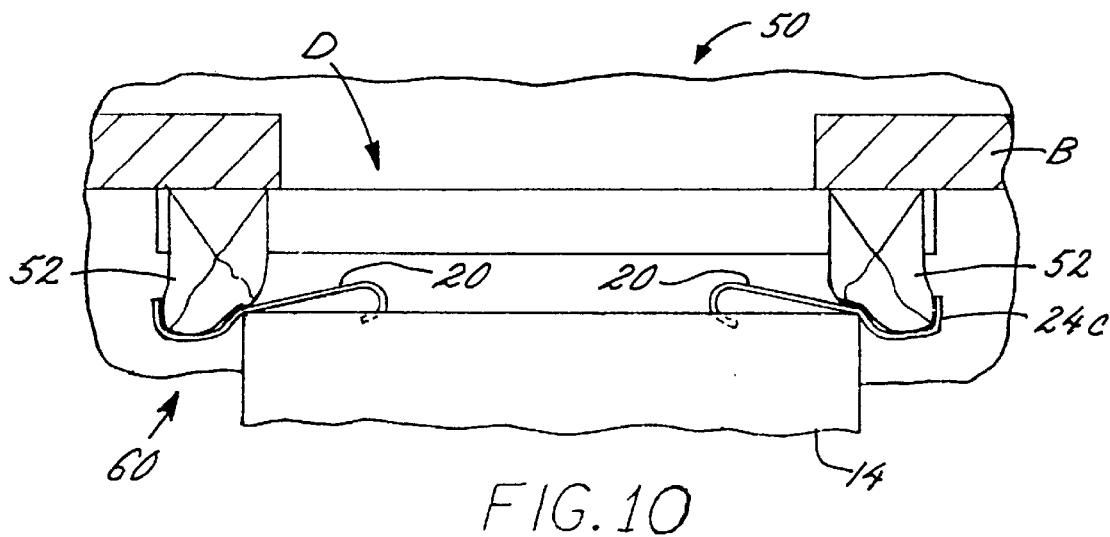
FIG. 10 is a top plan view of the combined dock seal and shelter of FIG. 9 showing the side pad members engaging the peripheral edges of the truck.

If the truck 14 is sufficiently wide so as to engage both pad members 52, the rear peripheral edges 14R of the truck 14 will compress the pad members 52 as generally shown in FIG. 10. The pad members 52 resiliently deform about the peripheral edges 14R of the truck 14 to create a seal therebetween. After the truck 14 departs, the resilient pad member 52 return to their original rectangular shape.

In accordance with certain objects of the invention, the sealing device 60 may be easily and selectively removed from the pad member 52 before the truck 14 is parked in the loading dock D. As previously described, in order to reduce wear on the sealing device 60 and prolong its life, it may be desirable to remove the sealing device 60 when the exterior weather conditions are favorable or when the incoming trucks 14 have a configuration capable of directly engaging the pad member 52 and the presence of the sealing device 60 would be redundant or interfere with loading or unloading. The sealing device 60 may be selectively reattached to the pad member 52 in the event of adverse weather conditions or if the truck 14 is relatively narrow and unable to engage both of the opposing pad members 52. Instead of removing the sealing device 60, it will also be appreciated that the sealing device 60 including, for example, the seal assembly 20 or the curtain member 64, may be folded or otherwise positioned so that it does not interfere with the loading and unloading of the truck 14. Referring to FIG. 14 for illustrative purposes, the sealing device 60 may be folded and secured, using conventional attaching methods such as hook and latch means, inwardly along interior side edge 52d of the pad member 54 or outwardly along the exterior side edge 52b.

Figure 11:
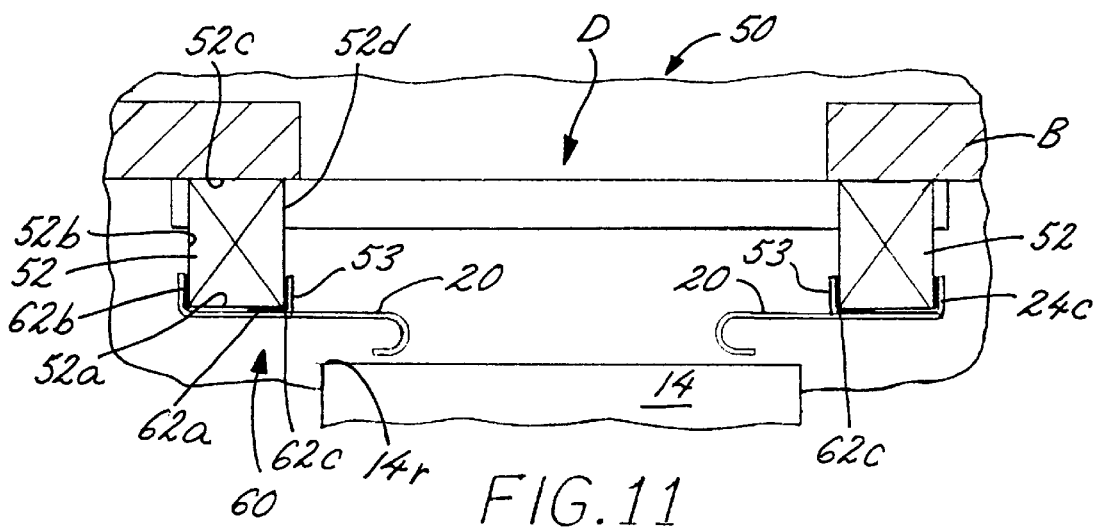
FIG. 11 is a top plan view of the combined dock seal and shelter of FIG. 9 showing the seal assembly in the disengaged position for receiving a truck therebetween.

If the truck 14 is sufficiently narrow so as to fit between the pad members 52 as shown in FIGS. 11–12, the seal assembly 20 is adapted to engage the peripheral edge 14R or the interior wall of the truck 14 as previously described. Similarly, the curtain member 64 is adapted to engage the exterior wall 14a of the incoming truck 14. A substantially air-tight seal or an air-blocking seal is formed by the engagement curtain member 64 and the exterior truck wall. It should also be appreciated that since the pad members 52 are also resilient, they may deform to accommodate the inward movement of the truck 14 and minimize the stresses resulting from the inward flexing of the sealing device 60. After the truck 14 departs the loading dock D, the sealing device 60 returns to its original disengaged position.

The combined loading dock and seal 50 is adapted to provide a seal when the truck 14 is parked in the loading dock D in a skewed or "off-center" position relative to the center line of the loading dock D as generally shown in FIG. 13. In conventional dock shelters, the frame assembly 19 might be damaged by such off-center alignment of the truck 14 and, in conventional dock seals, a gap would exist at the left side of the truck 14. Referring to FIG. 13, it will be seen that, in the combined dock seal and shelter 50 of the present invention, the right pad member 52 will deform and compress to accommodate the right peripheral edge 14R of the truck 14 and the left side of the sealing device 60 will resiliently flex in order to accommodate the left side of the truck 14.

Thus, it will be seen that seal assembly 20 and the combined dock seal and shelter 50 and related sealing devices have been provided which attain the aforenoted objects. Various additional modifications of the described embodiments of the invention specifically illustrated and described herein will be apparent to those skilled in the art, particularly in light of the teachings of this invention. Thus, while preferred embodiments of the present invention have been disclosed, it will be appreciated that it is not limited thereto but may be otherwise embodied with the scope of the following claims.

We claim as our invention:

1. A combined dock seal and shelter for mounting on a dock opening in a loading dock comprising:

at least one seal pad for mounting along a side of the opening wherein said seal pad has a substantially flexible, resilient, and compressible core capable of compressing and deforming in response to engagement with a peripheral end of a truck parked in the loading dock so as to form a seal therewith, and a flexible seal assembly having a panel member and a seal member, each of the panel member and seal member having first and second ends, wherein the first end of the panel member is attached to the seal pad for supporting the seal member and the panel member is flexible between a disengaged position in which the panel member extends generally into the path of the incoming truck and a sealing position in which the panel member bends toward the dock opening upon engagement against the truck, and the first end of the seal member is joined to the panel member and the second end of the seal member is disposed in the path of the incoming truck so as to engage the incoming truck, wherein the seal member flexes in response to the truck to conform to the contours of the truck end and sealably engage said truck end, and wherein the cross sectional thickness of the seal member remains substantially unchanged after engagement with the truck.

2. The dock seal and shelter as in claim 1 wherein the seal assembly is releasibly and selectively attached to the seal pad to permit the seal assembly to be selectively removed from the seal pad.

3. The dock seal and shelter as in claim 1 wherein the seal member has a generally hook-shaped cross section in the disengaged position and flexes between the hook shape and a substantially straight cross section in response to the truck.

4. The dock seal and shelter as in claim 1 wherein the seal pad has an inside and outside and the seal member is foldable to a position adjacent at least one of the inside and outside of the seal pad to allow increased ventilation.

5. The dock seal and shelter as in claim 4 wherein the seal member is releasably attachable to the seal pad to hold the seal member in said folded position.

6. The seal assembly as in claim 1 wherein the panel member is formed of a blend of materials so that the flexibility of the panel member varies from the first end to the second end.

7. The seal assembly as in claim 6 wherein the panel member is more stiffer at the first than at the second end.

8. The seal assembly as in claim 1 wherein the seal member is formed of a blend of materials so that the flexibility of the seal member varies from the first end to the sealing second end.

9. The seal assembly as in claim 8 wherein the seal member is more stiffer at the first end than at the second end.

10. The seal assembly as in claim 9 wherein the seal member is fabricated from ethylene propylene rubber.

11. The seal assembly as in claim 10 wherein the seal member has a durometer from about 80 to about 90 Shore A.

12. The seal assembly as in claim 1 wherein the panel and seal members are formed as separate members and the second end of the panel member is attached to the first end of the seal member.

13. The seal assembly as in claim 1 wherein the panel and seal members are formed as an integral member.

14. The seal assembly as in claim 1 wherein the seal member is formed of a material which is more flexible than the panel member.

15. The dock seal and shelter as in claim 2 wherein the seal assembly is releasibly connected to the seal pad using a hook and loop attachment device wherein the attachment device has a loop portion attached to one of the seal assembly and the seal pad and a latch portion attached to the other of the seal assembly and the seal pad so that the seal assembly and the seal pad are attached together when the hook and loop portions engage each other.

16. A combined dock seal and shelter for mounting on a dock opening in a loading dock comprising:

at least one substantially flexible, resilient, and compressible seal pad for mounting along a side of the opening capable of compressing and deforming in response to engagement with a vehicle parked at the loading dock so as to form a seal therewith; and a curtain member constructed substantially completely of fabric material and having a plurality of resilient support members, the curtain member also having a first end which is attached to the seal pad and a second end which is capable of engaging the vehicle while parked at the loading dock to form a seal therewith, and wherein the first end of the curtain member is selectively releasibly attached to the seal pad with a hook and loop attachment device.

17. The dock seal and shelter as in claim 16 wherein the curtain member is foldable to a position adjacent to the seal pad.

18. The dock seal and shelter as in claim 17 wherein the second end of the curtain member is selectively releasibly attachable to a side of the seal pad to hold the curtain member in said folded position.

19. The dock seal and shelter as in claim 16 wherein the hook and loop attachment device includes a loop portion attached to one of the seal pad and the first end of the curtain member and a hook portion attached to the other of the seal pad and the first end of the curtain member so that the seal pad and the first end of the curtain member are selectively releasibly attached together when the hook and loop portions engage each other.

20. The dock seal and shelter as in claim 16 wherein the resilient support members are stays.

21. The dock seal and shelter as in claim 16 wherein the resilient support members extend between the first and second ends of the curtain member in a generally horizontal manner.

22. The dock seal and shelter as in claim 16 wherein the curtain member resiliently flexes between a disengaged position, wherein the second end is substantially straight with respect to the first end, and a sealing position, wherein the second end is bent with respect to the first end, in response to engagement with the vehicle.

23. The dock seal and shelter as in claim 16 wherein the resilient support members bias the curtain member into the disengaged position.

24. The dock seal and shelter as in claim 22, wherein the seal pad comprises a foam core.

25. A loading dock shelter system for use with a truck parked adjacent a dock opening having side edges and a top edge wherein the truck has a cargo bay, interior and exterior wall surfaces and lateral peripheral ends, the dock shelter comprising:

at least one seal pad for mounting at one of said edges wherein said seal pad has a substantially flexible, resilient, and compressible core for compressing and deforming in response to engagement with at least one end of said truck so as to form an air-blocking seal therewith, and at least one seal assembly flexibly, selectively and releasibly attached to the seal pad for movement between a disengaged position wherein the seal assembly projects into the path of the incoming truck and sealing position wherein the seal assembly engages at least one of said truck ends for forming an air-blocking seal, wherein the seal assembly comprises a seal member extending from one of said edges and having a free edge laterally adapted for resilient, flexible displacement toward said opening and a hook extending from the free edge of said member and having a hook-shaped cross section for hookably engaging the one of lateral end of the incoming truck in the disengaged position and a substantially straight cross section in the engaged position, and wherein the cross-sectional thickness of the seal member remains substantially unchanged after engagement with the truck.

26. A combined dock seal and shelter for mounting on a dock opening in a loading dock comprising:

at least one seal pad along a side of the opening wherein said seal pad has a substantially flexible, resilient, and compressible core capable of engaging a peripheral end of a truck parked in the loading dock so as to form a seal therewith, and a flexible seal assembly having a panel member and a seal member, wherein the seal member is more flexible than the panel member and each of the panel member and the seal member having first and second ends, wherein the first end of the panel member is attached to the seal pad for supporting the seal member and the panel member is flexible between a disengaged position in which the panel member extends generally into the path of the incoming truck and a sealing position in which the panel member bends toward the dock opening upon engagement against the truck, and the first end of the seal member is joined to the panel member and the second end of the seal member is disposed in the path of the incoming truck so as to engage the incoming truck, wherein the seal member flexes in response to the truck to conform to the contours of the truck end and sealably engage said truck end, and wherein the cross sectional thickness of the seal member remains substantially unchanged after engagement with the truck.

27. A combined dock seal and shelter for mounting on a dock opening in a loading dock comprising:

at least one seal pad for mounting along a side of the opening wherein said seal pad has a substantially flexible, resilient, and compressible core capable of engaging a peripheral end of a truck parked in the loading dock so as to form a seal therewith, and a flexible seal assembly having a panel member and a seal member, each of the panel member and the seal member having first and second ends, wherein the first end of the panel member is attached to the seal pad for supporting the seal member and the panel member is flexible between a disengaged position in which the panel member extends generally into the path of the incoming truck and a sealing position in which the panel member bends toward the dock opening upon engagement against the truck, and wherein the panel member is formed of a blend of materials so that the flexibility of the panel member varies from the first end to the second end, and the first end of the seal member is joined to the panel member and the resilient, flexible second end of the seal member is disposed in the path of the incoming truck so as to engage the incoming truck, wherein the seal member flexes in response to the truck to conform to the contours of the truck end and sealably engage said truck end, and wherein the cross sectional thickness of the seal member remains substantially unchanged after engagement with the truck.

28. The seal assembly as in claim 27 wherein the panel member is more stiffer at the first end than at the second end.

29. A combined dock seal and shelter for mounting on a dock opening in a loading dock comprising:

at least one seal pad for mounting along a side of the opening wherein said seal pad has a substantially flexible, resilient, and compressible core capable of engaging a peripheral end of a truck parked in the loading dock so as to form a seal therewith, and a flexible seal assembly having a panel member and a seal member, each of the panel member and the seal member having first and second ends, wherein the seal member is formed of a blend of materials so that the flexibility of the seal member varies from the first end to the second end, and wherein the first end of the panel member is attached to the seal pad for supporting the seal member and the panel member is flexible between a disengaged position in which the panel member extends generally into the path of the incoming truck and a sealing position in which the panel member bends toward the dock opening upon engagement against the truck, and the first end of the seal member is joined to the panel member and the resilient, flexible second end of the seal member is disposed in the path of the incoming truck so as to engage the incoming truck, wherein the seal member flexes in response to the truck to conform to the contours of the truck end and sealably engage said truck end, and wherein the cross sectional thickness of the seal member remains substantially unchanged after engagement with the truck.

30. The seal assembly as in claim 29 wherein the seal member is stiffer at the first end and more flexible at the second end.

31. The seal assembly as in claim 30 wherein the seal member is fabricated from ethylene propylene rubber.

32. The seal assembly as in claim 31 wherein the seal member has a durometer from about 80 to about 90 Shore A.

33. A combined dock seal and shelter for mounting on a dock opening in a loading dock comprising:

at least one seal pad for mounting along a side of the opening wherein said seal pad has a substantially flexible, resilient, and compressible core capable of engaging a peripheral end of a truck parked in the loading dock so as to form a seal therewith, and a flexible seal assembly having a panel member and a seal member, each of the panel member and the seal member having first and second ends, wherein the panel member and the seal member are formed as separate members and the second end of the panel member is attached to the first end of the seal member, and wherein the first end of the panel member is attached to the seal pad for supporting the seal member and the panel member is flexible between a disengaged position in which the panel member extends generally into the path of the incoming truck and a sealing position in which the panel member bends toward the dock opening upon engagement against the truck, and the first end of the seal member is joined to the panel member and the resilient, flexible second end of the seal member is disposed in the path of the incoming truck so as to engage the incoming truck, wherein the seal member flexes in response to the truck to conform to the contours of the truck end and sealably engage said truck end, and wherein the cross sectional thickness of the seal member remains substantially unchanged after engagement with the truck.

34. A combined dock seal and shelter for mounting on a dock opening in a loading dock comprising:

at least one seal pad for mounting along a side of the opening wherein said seal pad has a substantially flexible, resilient, and compressible core capable of engaging a peripheral end of a truck parked in the loading dock so as to form a seal therewith, and a flexible seal assembly having a panel member and a seal member, each of the panel member and the seal member having first and second ends, wherein the panel member and the seal member are formed as an integral member, and wherein the first end of the panel member is attached to the seal pad for supporting the seal member and the panel member is flexible between a disengaged position in which the panel member extends generally into the path of the incoming truck and a sealing position in which the panel member bends toward the dock opening upon engagement against the truck, and the first end of the seal member is joined to the panel member and the resilient, flexible second end of the seal member is disposed in the path of the incoming truck so as to engage the incoming truck, wherein the seal member flexes in response to the truck to conform to the contours of the truck end and sealably engage said truck end, and wherein the cross sectional thickness of the seal member remains substantially unchanged after engagement with the truck.

* * * * *

UNITED STATES PATENT AND TRADEMARK OFFICE
CERTIFICATE OF CORRECTION

PATENT NO. : 5,953,868
DATED : September 21, 1999
INVENTOR(S) : Giuliani et al.

It is certified that error appears in the above-identified patent and that said Letters Patent is hereby corrected as shown below:

Column 13, claim 7,
Line 48, after "member is more", delete "stiffer" and insert -- stiff --.

Column 13, claim 9,
Line 54, after "member is", delete "more".

Column 15, claim 25,
Line 12, after "engaging", delete "the one of" and insert -- one of the --.
Line 13, delete "end" and insert -- ends --.

Column 16, claim 28,
Line 9, after "member is", delete "more".

Column 16, claim 30,
Line 40, after "member is", delete "stiffer" and insert -- more stiff --.

Signed and Sealed this

Eighth Day of January, 2002

*Attest:*

JAMES E. ROGAN
*Director of the United States Patent and Trademark Office*

*Attesting Officer*